(12) United States Patent
Fushiki et al.

(10) Patent No.: US 6,868,524 B1
(45) Date of Patent: Mar. 15, 2005

(54) METHOD AND APPARATUS FOR TEXT LAYOUT ACROSS A REGION

(75) Inventors: Ikko Fushiki, Redmond, WA (US); Hock San Lee, Redmond, WA (US); Donald B. Curtis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/425,132

(22) Filed: Oct. 22, 1999

(51) Int. Cl.[7] .................. G06F 15/00; G06F 17/00; G06F 17/21

(52) U.S. Cl. .............. 715/529; 715/502; 715/517; 715/520; 715/531; 382/276; 382/286; 382/289; 382/293; 382/296; 345/467; 345/619

(58) Field of Search .................. 715/517, 520, 715/529, 502, 531; 382/276, 286, 289, 293, 296; 345/467, 619

(56) References Cited

U.S. PATENT DOCUMENTS

| | | | | |
|---|---|---|---|---|
| 5,335,290 A | * | 8/1994 | Cullen et al. | 382/176 |
| 5,754,873 A | * | 5/1998 | Nolan | 715/527 |
| 6,081,816 A | * | 6/2000 | Agrawal | 715/521 |
| 6,285,460 B1 | * | 9/2001 | Koh et al. | 358/1.18 |
| 6,320,601 B1 | * | 11/2001 | Takasu et al. | 345/764 |
| 6,356,279 B1 | * | 3/2002 | Halstead et al. | 345/619 |
| 6,377,704 B1 | * | 4/2002 | Cooperman | 382/176 |

OTHER PUBLICATIONS

Newman et al., "CamWorks: A Video–based Tool for Efficient Capture from Paper Source Documents", Jun. 1999, IEEE International Conference on Multimedia Computing and Systems, 1999., vol. 2, pp. 647–653.*

* cited by examiner

*Primary Examiner*—Joseph Feild
*Assistant Examiner*—Almari Yuan
(74) *Attorney, Agent, or Firm*—Theodore M. Magee; Westman, Champlin & Kelly, P.C.

(57) ABSTRACT

The present invention displays text within a region by identifying text boxes within the region. To identify the text boxes, the invention uses scan lines that are spaced at intervals that are smaller than the text height of the text to be placed in the boxes. These scan lines are combined to identify the full text boxes. Additionally, under the invention, a region is transformed before text boxes are generated for the region. The transform is an inverse of a text transform that is applied to the text placed in the region. This allows rotated and skewed text to be placed in the region. The invention also facilitates displaying a single text string across several disjointed regions.

24 Claims, 7 Drawing Sheets

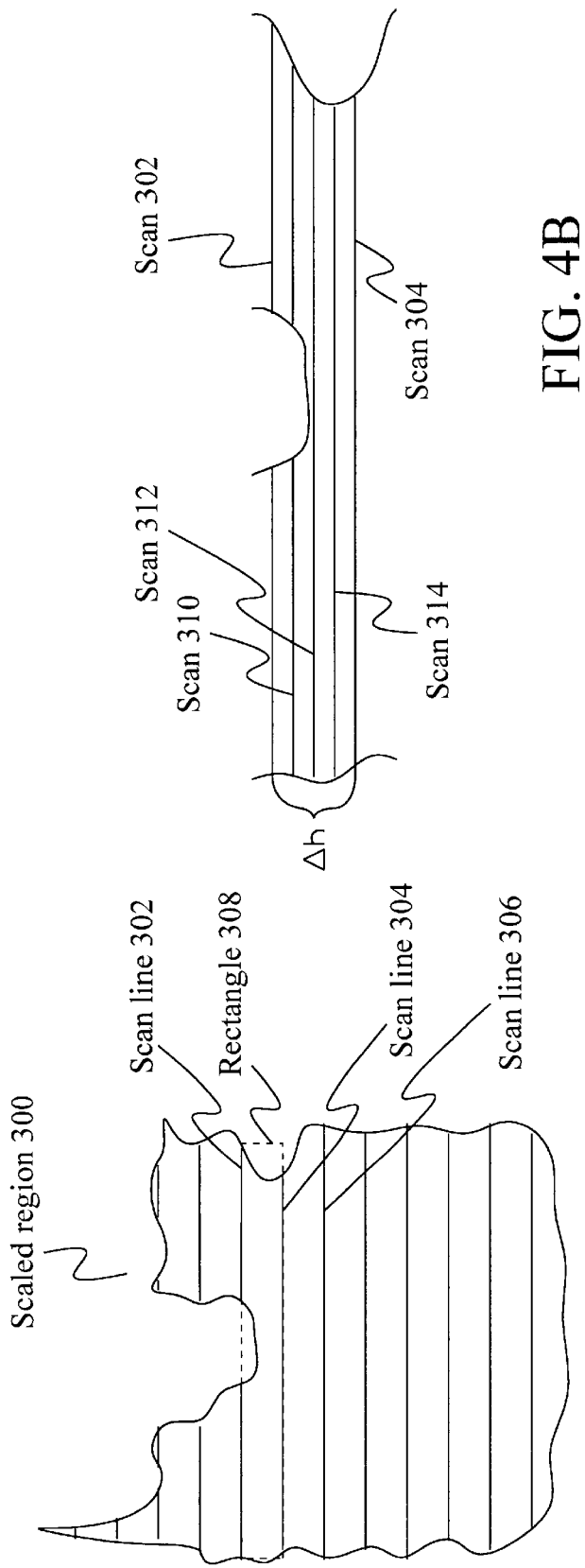

Text 400
Region 402

Region 402

Region 404

Region 406

METHOD AND APPARATUS FOR TEXT LAYOUT ACROSS A REGION

BACKGROUND OF THE INVENTION

The present invention relates to displaying text on a computer screen. In particular, the present invention relates to displaying text within a region on a computer screen.

To allow different areas of a computer screen to have different appearances, the prior art has developed a coding construct known as a region, which is defined as an area located within the perimeter of a closed shape or some combination of closed shapes. Often, a region is defined as a combination of rectangles, ellipses and polygons.

To write text within a region, a series of rectangles are generated within the region. In the prior art, these rectangles are generated using a technique associated with rendering a region to a screen. Under this technique, the region is "scanned" to produce a set of vertically stacked rectangles that approximate the region. The height of each of these rectangles is fixed and determines the granularity of the approximation. In general, shorter rectangles provide a more accurate representation of the region but also require more data.

Under text layout systems of the prior art, this scanning technique is used to identify a series of rectangles in which text may be written. Since the rectangles must accommodate the text, the height of the rectangles is set equal to the height of the text that is to be written in the region.

This technique can cause problems if the region is later rendered using shorter rectangles than the rectangles used to layout the text. In particular, the higher definition rectangles can cause a perimeter of the region to intersect some of the text that is supposed to be contained within the region. To avoid this problem, the region's rendering rectangles can be made the same height as the text rectangles, but this may diminish the appearance of the region's perimeter.

In addition, since the scanning technique only builds horizontal rectangles, the prior art has been unable to achieve sophisticated text layouts. In particular, the prior art does not provide a way to skew or rotate text within a region.

Prior art text layout systems have also been limited to placing text in a single region. Under the prior art there is no means for wrapping a string of text across multiple regions with a single function call.

SUMMARY OF THE INVENTION

Embodiments of the present invention display text within a region by identifying text boxes within the region. To identify the text boxes, these embodiments use scan lines that are spaced at intervals that are smaller than the text height of the text to be placed in the boxes. These scan lines are combined to identify the full text boxes.

In other embodiments of the invention, a region is transformed before text boxes are generated for the region. The transform is an inverse of a text transform that is applied to the text placed in the region. This allows rotated and skewed text to be placed in the region.

In other embodiments of the invention, a single text string is displayed across several disjointed regions.

BRIEF DESCRIPTION OF THE DRAWINGS

FIGS. 4A and 4B show a region with scan lines used in identifying text boxes under embodiments of the present invention.

DETAILED DESCRIPTION OF ILLUSTRATIVE EMBODIMENTS

Figure 1:
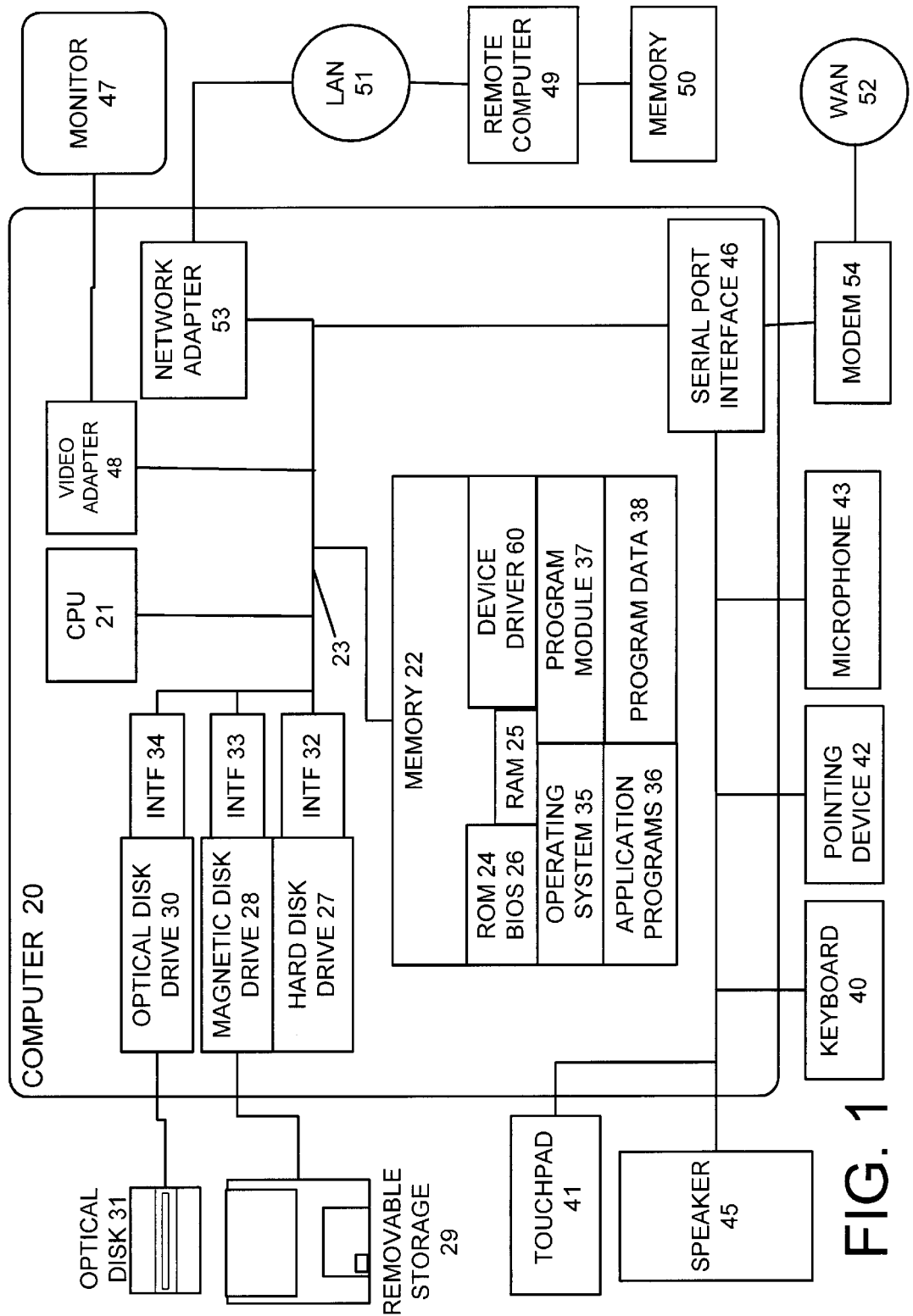
FIG. 1 is a block diagram of a general computing environment in which embodiments of the present invention may be practiced.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Under embodiments of the present invention, a method and apparatus are provided that reduce the chances that the perimeter of a region will intersect text appearing in the region. Other embodiments of the invention permit text to be transformed by rotating or skewing the text within a region. Still further embodiments of the invention allow a single string of text to be written across several different regions. Each of these aspects is discussed further below.

Figure 2:
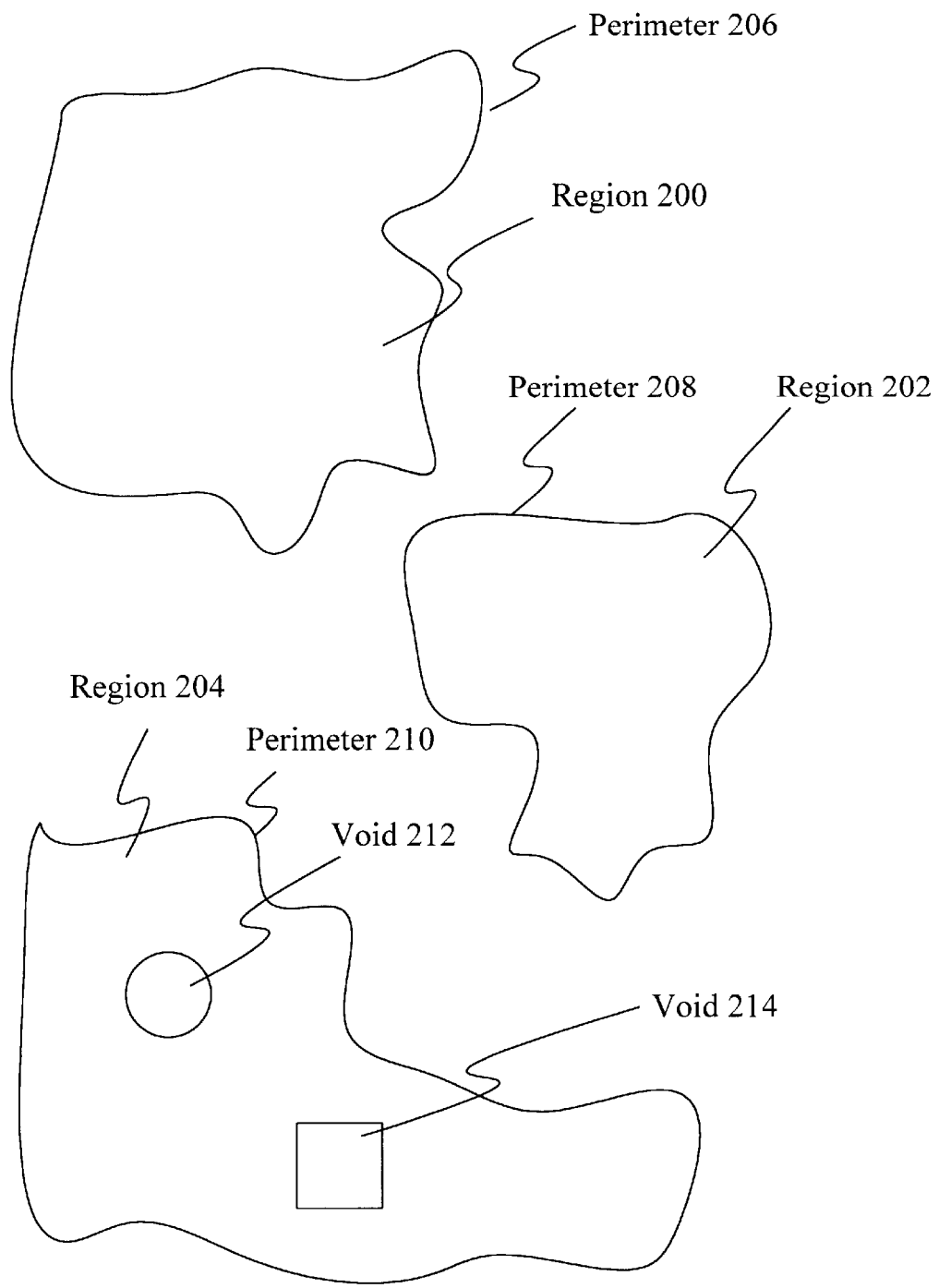
FIG. 2 is a view of a region layout for a document.

Examples of regions in which text can be inserted under embodiments of the present invention are shown in FIG. 2. Specifically, FIG. 2 shows a display layout having three separate regions 200, 202, and 204. Each of the regions is defined by a respective perimeter 206, 208, and 210 that is formed from a collection of smooth curves and lines. Region 204 includes two voids 212 and 214 that are excluded from the region. Regions 200, 202 and 204 are provided only as examples of possible regions. Other regions with different shapes and sizes are contemplated under the present invention.

Figure 3:
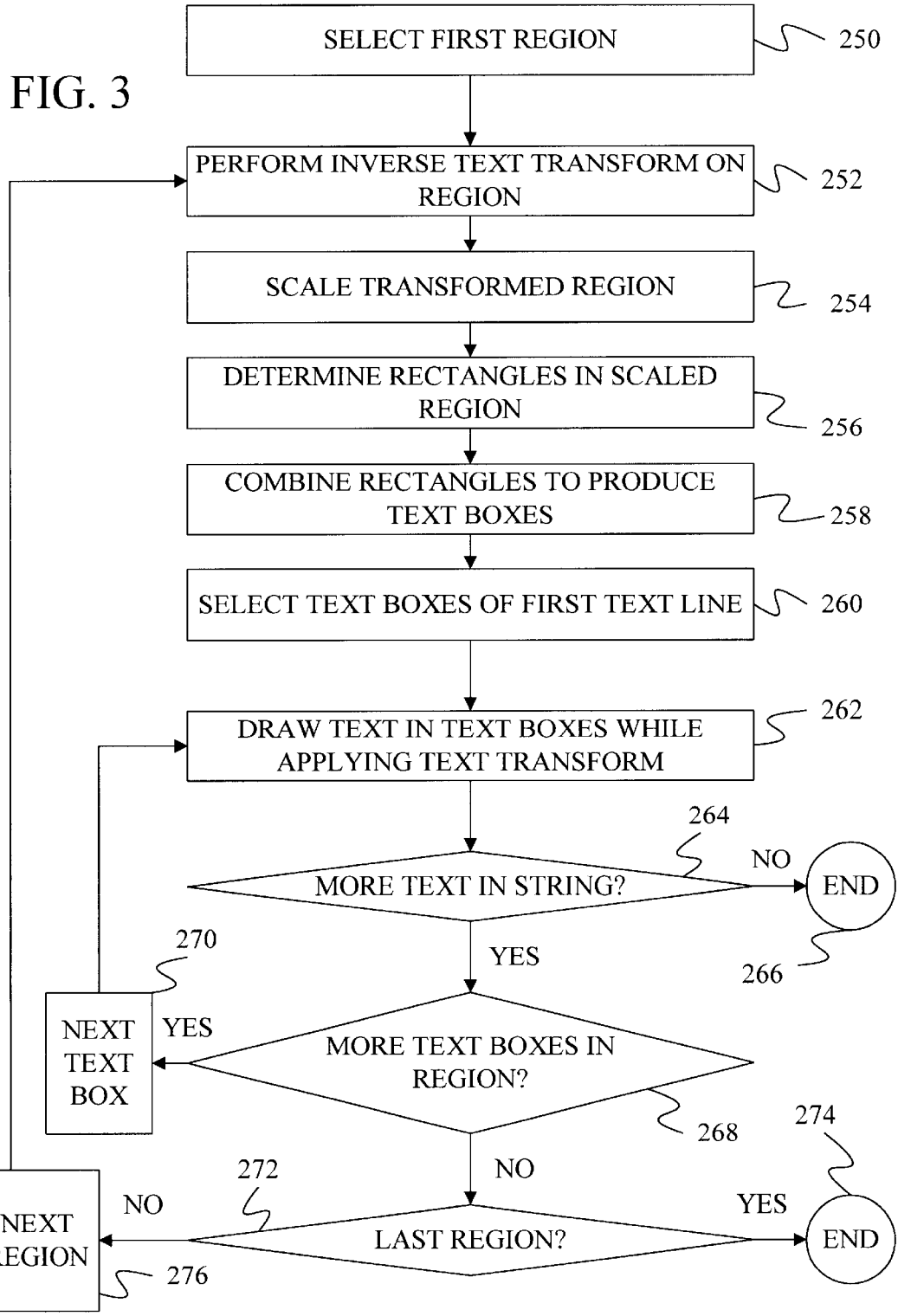
FIG. 3 is a flow diagram of a method for displaying text in regions under embodiments of the present invention.

FIG. 3 provides a flow diagram for displaying in a set of regions under one embodiment of the present invention. In step 250, the method accesses a description of the first region in a list of regions in which a text string is to be written. In most embodiments, the description of the region includes an arithmetic description of the basic shapes that constitute the region and the operations that are performed on those shapes to create the region. Often, the arithmetic description of the basic shapes includes separate arithmetic expressions for the x and y coordinates of the shapes' respective perimeters.

Figure 5A:
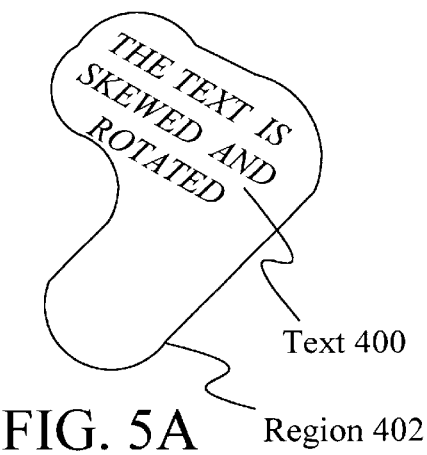
FIG. 5A is a display of a region with transformed text displayed inside it.

At step 252, arithmetic expressions that describe the region are transformed. Specifically, the region is transformed using the inverse of a text transform that is to be applied to the region's text. For example, if the text is to appear rotated and skewed in the region, as shown in FIG. 5A for text 400 in region 402, the inverse of the transform needed to convert the text in that manner is applied to the region. Thus region 402, shown in its original position in FIG. 5B, must be rotated in the opposite direction to the rotation desired for the text. This produces rotated region 404 of FIG. 5C. The region must also be skewed in the opposite manner to the desired skewing for the text. This produces rotated and skewed region 406 of FIG. 5D. Although the inverse transform is shown as being completed in two steps in FIGS. 5C and 5D, those skilled in the art will recognize that both changes to the region can be implemented using a single transform function. The inverse transform is not limited to rotation or skew and other inverse text transforms such as translation may be applied.

The inverse text transform is performed to allow text boxes to be generated for text that is to appear rotated or skewed in the region while using a standard Application Program Interface (API) that is designed to only build horizontal text boxes. In operating systems such as Windows® 95, Windows® 98, Windows® 2000, Windows® CE and Windows® NT from Microsoft Corporation of Redmond, Washington, this API is known as GetRegionData, which is described in detail in the Microsoft Software Developers Network, published July 1998 by Microsoft Corporation.

After the inverse text transform is performed on the region, the transformed arithmetic expressions that describe the region are transformed again at step 254 using a scaling equation:

$$(x' \ y') = (x \ y) \begin{pmatrix} 1 & 0 \\ 0 & \frac{n}{\Delta h} \end{pmatrix} \qquad \text{EQ. 1}$$

where x' and y' are the scaled versions of the expressions that describe the x and y coordinates of the perimeter of the region, n is a granularity value, and $\Delta h$ is the height of the text to be inserted in the region.

The transform of equation 1 is performed to set the scan interval used to generate a set of rectangles within the region. Specifically, when the GetRegionData API is used to build the text boxes, the API scans the region passed to it at fixed intervals along the y-coordinate. As such, if the height of the region is scaled down, the relative space between scans increases. Thus, by dividing the region's y-coordinate by the height of the text, $\Delta h$, equation 1 causes the scans to occur at locations along the region that were separated by a distance of $\Delta h$ before the scaling transform was performed. Examples of the scan lines that would be produced along a scaled down region 300 are shown as scan lines 302, 304, and 306 in FIG. 4A. Note that these scan lines represent the scans that would be produced if the y-coordinate of the region were only divided by $\Delta h$. The effects of multiplying the y-coordinate by n are discussed below.

The value $\Delta h$ is selected because used alone it causes GetRegionData to return a set of rectangles that can accommodate the text to be written to the region. For example, if a region were passed to GetRegionData after being scaled down by $\Delta h$, GetRegionData would return a set of rectangles like rectangle 308 of FIG. 4A. Because of the scaling, rectangle 308 has a height equal to the text height, $\Delta h$, and can be used directly to write text within the region.

Under many embodiments of the present invention, the granularity factor, n, is added to the scaling function so that multiple scans are performed for each text box. Examples of these additional scans are shown as scans 310, 312, and 314 of FIG. 4B, which occur between scans 302 and 304 of FIG. 4A. As discussed further below, these additional scans improve the accuracy of the text boxes and reduce the chances that part of the region's perimeter will intersect text written within the region.

Figure 6:
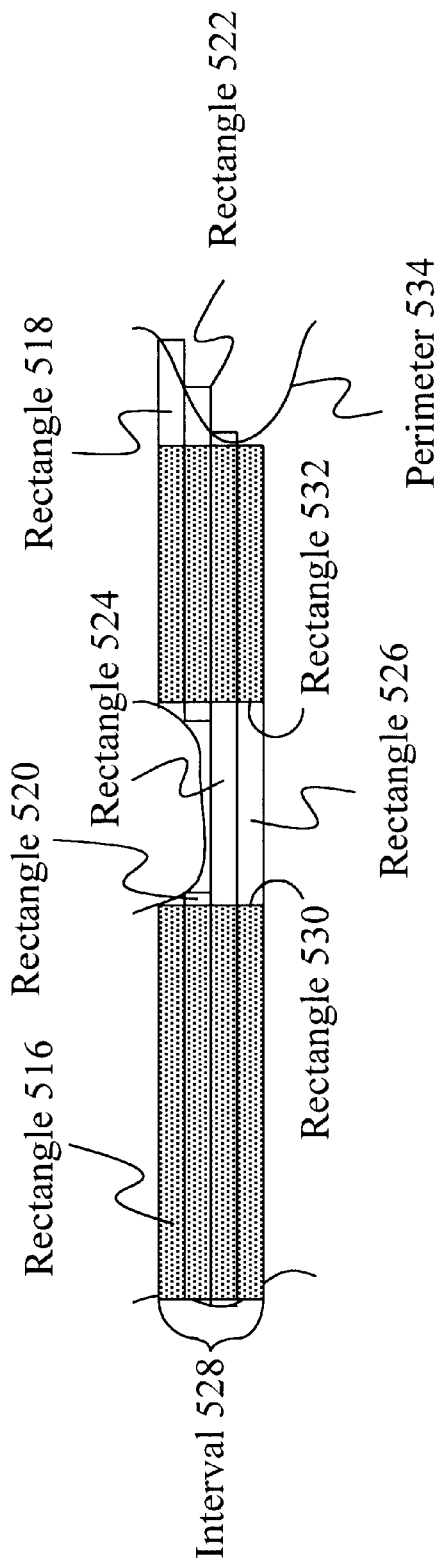
FIG. 6 is a graph of a set of rectangles generated to identify a set of text boxes.

After the scaling transform has been applied to the region at step 254 of FIG. 3, the process continues at step 256 where GetRegionData is called to generate a set of rectangles based on the transformed region. As noted above, because of the scaling, GetRegionData forms a set of n rectangles for each text height interval $\Delta h$. A set of such rectangles 516, 518, 520, 522, 524, and 526 are shown in FIG. 6 for an interval 528 that is equal to the text height $\Delta h$. Each rectangle has the same height of $\Delta h/n$ and each rectangle is formed by extending the rectangle below the points where scan lines intersected the perimeter of the region. Note that rectangles 516 and 518 are formed from a single scan line, as are rectangles 520 and 522.

Once the rectangles have been returned by GetRegionData, the process continues at step 258 where rectangles within each span of $\Delta h$ are combined using a logical AND operation. This operation forms one or more rectangles for each text line that is to be written to the region.

In one embodiment, this AND operation is performed sequentially by combining two lines of rectangles to form one result, then combining the result with the next line of rectangles to form a new result. Each result is a new set of rectangles that represent the areas where the rectangles of the two lines overlap. The process of combining the latest result with the next line continues until all of the lines have been combined.

The AND operation may be implemented by collecting the left and right coordinates of each rectangle in the two lines under consideration. These coordinates are then ordered from least to greatest. Within this ordered list, a left coordinate followed by a right coordinate represents a rectangle that results from the AND operation. Thus, selecting each such left, right pair in the list produces the rectangle for the AND operation. Under such an embodiment, the coordinates for all of the lines in the text height interval can be considered at one time by including all of the rectangle coordinates in the ordered list.

FIG. 6 shows two resulting rectangles 530 and 532 (shaded) from such an AND operation performed on rectangles 516, 518, 520, 522, 524, and 526 over interval 528. Shaded rectangles 530 and 532 represent text boxes for one text line into which text may be written within the region. Because the rectangles that were used to form text boxes 530 and 532 are shorter than the text boxes themselves, there is less chance that the text boxes will extend beyond the perimeter of the region. This can be seen from FIG. 6 by comparing text boxes 530 and 532 to rectangles 516 and 518. If the scaling factor used to scale the region did not include the granularity factor n, the text boxes would have the same width as rectangles 516 and 518 and a height equal to interval 528. Note that extending the far right side of rectangle 518 to the bottom of interval 528 would create a text box that extends outside of perimeter 534 of FIG. 6. This could cause text placed within this text box to intersect perimeter 534, obscuring the text and the perimeter. However, with the present invention, text box 532 does not extend outside of perimeter 534 thereby reducing the chances of such interference between the perimeter and the text.

After the text boxes have been generated at step 258, the text boxes of the topmost text line in the region are selected at step 260 and passed to a function that fills the text box with a portion of the text string at step 262. Since each text box has a limited width, not all of the text string may fit in the text boxes of the current text line. In most embodiments, the text boxes are filled such that words are not divided between two separate text boxes or if a word is divided between two text boxes it is divided along a syllable break in the word and a hyphen is added to indicate the word break. Such word breaking is well known in the art.

Figure 5B:
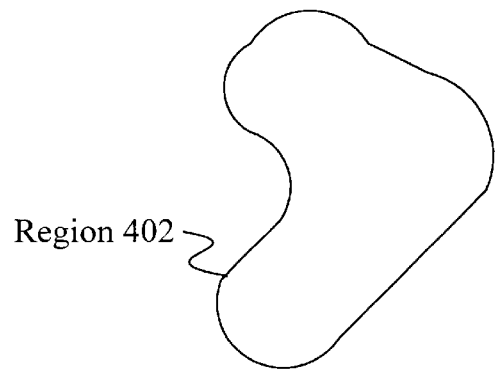
FIG. 5B is a display of the region of FIG. 5A.
Figure 5C:
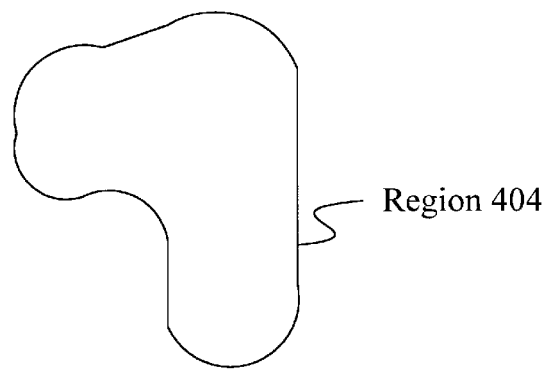
FIG. 5C is a display of the region of FIG. 5B after being transformed using the inverse of a text rotation transform.
Figure 5D:
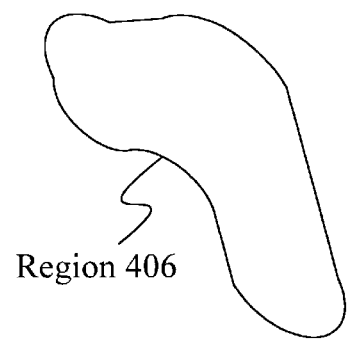
FIG. 5D is a display of the region of FIG. 5C after being further transformed using the inverse of a text skew transform.

After placing the text in the text box, the text is transformed to produce the desired graphic effect. For example, the text may be rotated and skewed through the transform. The result of such a transform is shown in FIG. 5A. Note that region 402 of FIG. 5A has its original appearance as depicted in FIG. 5B. The inverse text transform applied to the region in step 254 was only performed to calculate the location of the text boxes, and the displayed region remains unchanged.

After filling the text boxes of the current text line with as many characters as possible from the text string and transforming the text, the fill function returns the number of words or characters that were entered in the text boxes. This number is then subtracted from the total number of words or characters of the text string that were yet to be written to text boxes before step 262. If the result of this subtraction is zero at step 264, all of the text string has been written to the region and the process ends at step 266. If the subtraction produces a number greater than zero, the new number is set as the number of words or characters that still need to be written to the region.

The process then continues at step 268 where the process determines if there are any more text lines in the current region. Under most embodiments of the invention, the total number of text lines in the region is equal to the total number of lines returned by GetDataRegion divided by n. If there is another text line in the current region, the text boxes of the next text line are selected at step 270 and the process returns to step 262 where the new text boxes are filled with text from the text string.

If there are no more text lines in the current region at step 268, the process continues at step 272 where it determines if there are more regions in the list of regions. If there are no more regions, the process ends at step 274. If there is another region in the list of regions, the next region in the list is selected at step 276 and the process returns to step 252 where the new region is scaled.

When a window is redefined on a display, the regions within the window may also be redefined. Under one embodiment of the invention, when a region containing text is redefined, new text boxes are determined for the newly defined region using the techniques described above. The text is then written into the new text boxes. Since the text boxes are likely to have changed when the region changed, the layout of the text within the new region is usually different than the layout of the text in the old region.

Figure 7:
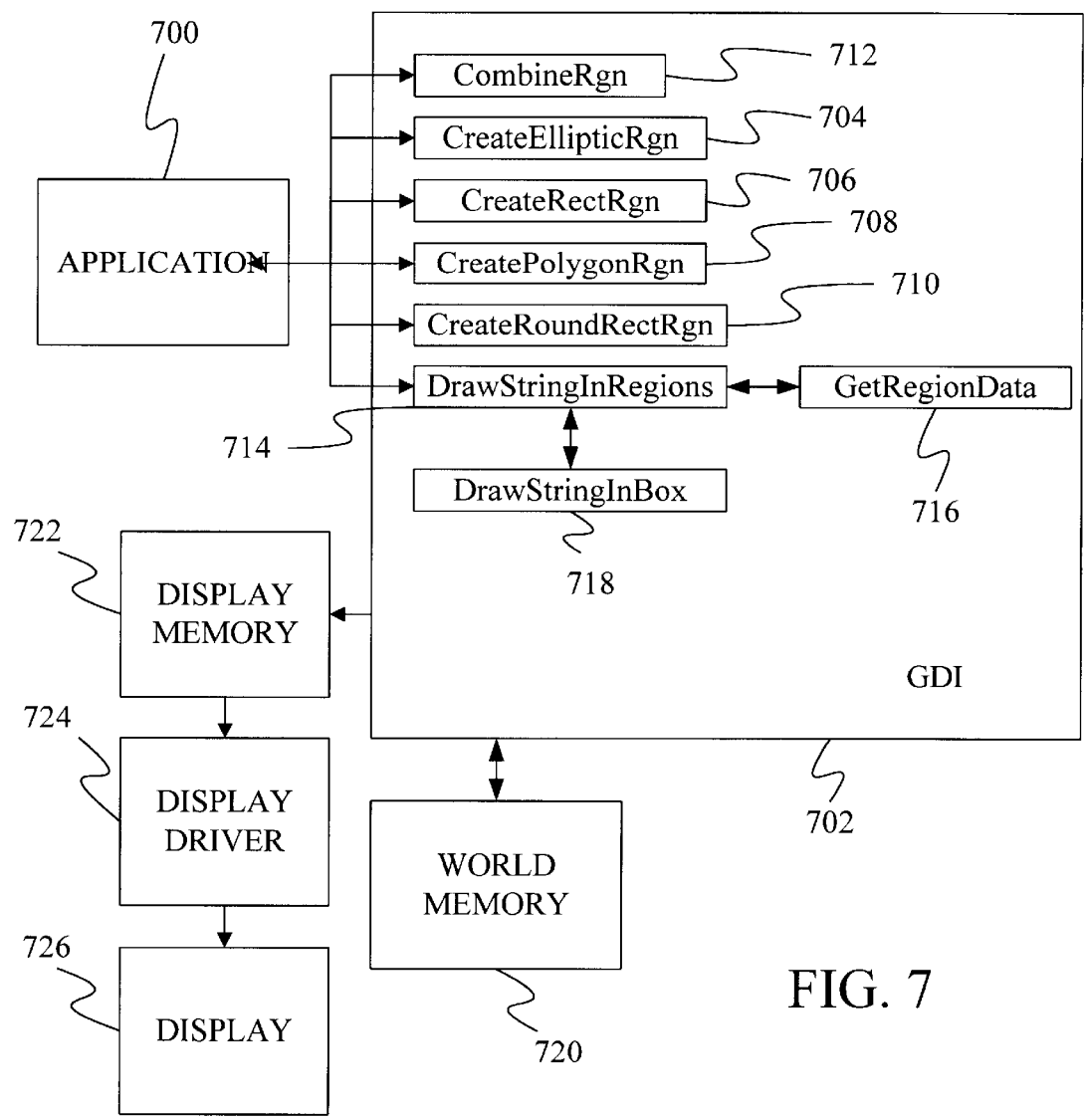
FIG. 7 is a more detailed block diagram of components found in one embodiment of the present invention.

FIG. 7 provides a more detailed block diagram of one embodiment of the present invention that is used in conjunction with an operating systems such as Windows® 95, Windows® 98, Windows® 2000, Windows® CE, and Windows® NT from Microsoft Corporation. Under this embodiment, an application 700 generates a set of regions using API's that form part of a Graphics Device Interface (GDI) 702. In particular, application 700 uses CreateEllipticRgn API 704, CreateRectRgn API 706, CreatePolygonRgn API 708, and CreateRoundRectRgn API 710 to construct basic elliptical, rectangular, polygonal and round-rectangular regions, respectively. The application then combines these basic regions using CombineRgn API 712. Each of these API's is discussed in more detail in the Microsoft Software Developers Network, published July 1998 by Microsoft Corporation.

Once it has defined the regions, application 700 passes a list of the regions along with a text string to DrawStringInRegions API 714. In one embodiment, this is done by making the function call "DrawStringInRegions(s, f, b, rgn, RgnCount, format, m)" where s is a string object that contains the text to be placed in the regions, f is a font object that contains the font of the text to be written, b is a brush object that defines the fill characteristics for the text, rgn is a list object that contains an ordered list of regions where the text is to be written, rgncount is the number of regions in the region list, format is an object that describes the location and orientation of the text within each text box, and m is a matrix object that contains the text transform for the text in the region.

Using the method described in FIG. 3 above, DrawStringInRegions API 714, draws the text into the regions. During this process, DrawStringInRegions API 714 calls GetRegionData API 716 as discussed above to obtain the rectangles that fit the region. DrawStringInRegions API 714 also calls DrawStringInBox API 718 to draw the text in each identified text box. In one embodiment, DrawStringInBox API 718 is called as "DrawStringInBox(s, f, b, textbox, format, m, start)" where "s" is the text string, "f" is the font of the text, "b" is the brush for the text, "textbox" is a list of text boxes in the current text line, "format" is the format of the text in the text boxes, "m" is the text transform matrix, and "start" is a current position within the text string.

The region and the text written into the region are stored by GDI 702 in a world memory 720. When application 700 sets the view to include a region, GDI 702 accesses the region's display values in world memory 720 and passes the values to a display memory 722, which is accessed by a display driver 724. Display driver 724 converts the display values in display memory 720 so that they are appropriate for a display 726 and then passes the converted values to display 726. The values are then displayed by display 726.

Although the description above has made reference to displaying English language text, the invention is not limited to displaying such text. In particular, languages that are written in a sequence of symbols collected in vertical columns may be displayed using the present invention by properly adjusting the format and transform of the characters.

Although the present invention has been described with reference to particular embodiments, workers skilled in the art will recognize that changes may be made in form and detail without departing from the spirit and scope of the invention.

What is claimed is:

1. A computer-implemented method of writing text within a region defined within at least a two-coordinate space, the text having a font height, the method comprising:

identifying spans that extend in the direction of a first coordinate, start and end at the perimeter of the region and cross a portion of the region, the spans separated from each other in the direction of the second coordinate by an interval that is smaller than the font height;

identifying aligned segments of two or more spans that cover the same first coordinate values;

defining at least one text box for a text line based on the aligned segments and the font height, the aligned segments defining a dimension of each text box in the direction of the first coordinate and the font height defining a dimension of each text box in the direction of the second coordinate; and writing text to the text box.

2. The method of claim 1 wherein identifying spans comprises:

scaling a region to produce a scaled region by dividing the second coordinate of the region by the font height and multiplying the result by a granularity value; and identifying the spans in the scaled region.

3. The method of claim 1 wherein identifying the spans comprises:

applying an inverse of a text transform to the region to produce a transformed region, the text transform representing a transform to be performed on text that is written to a text box; and identifying the spans in the transformed region.

4. The method of claim 3 wherein writing the text to the text box comprises applying the text transform to the text.

5. The method of claim 1 wherein defining at least one text box for a text line comprises defining multiple text boxes for a single text line.

6. The method of claim 1 further comprising defining at least one text box for each of a set of text lines in the region.

7. The method of claim 1 wherein the method is part of a larger method for writing a single text string across multiple regions, the larger method further comprising:

writing text to text boxes of a first region;

determining that no additional text should be placed in the text boxes of the first region;

determining that there is additional text in the text string; and writing text to text boxes of a second region.

8. The method of claim 1 wherein the method is invoked by issuing a call to a server process from a client process the call including issuing a plurality of parameters comprising a region identifier, a text identifier, and a font identifier.

9. The method of claim 8 wherein issuing a region identifier comprises issuing a list of region identifiers.

10. The method of claim 8 wherein issuing a plurality of parameters further comprises issuing a brush identifier.

11. The method of claim 8 wherein issuing a plurality of parameters further comprises issuing a format identifier.

12. The method of claim 8 wherein issuing a plurality of parameters further comprises issuing a text transform matrix identifier.

13. A computer-readable medium having computer-executable components comprising:
   a scanning component for identifying a set of lines that each extend in a horizontal direction, end at the perimeters of a region, cross over a portion of the region and are separated from each other in a vertical direction by a distance that is less than a text's height;
   a text box defining component for combining portions of the lines produced by the scanning component that are horizontally aligned with each other over an interval equal to the text's height to form at least one text box associated with at least one text line; and
   a writing component for writing text into at least one text box.

14. The computer-readable medium of claim 13 wherein the scanning component comprises:
   a scaling component for scaling a region along the vertical direction by dividing the region's vertical coordinate by the text's height and multiplying the result by a value greater than one; and
   a unit scanning component capable for identifying a set of lines that each extend in a horizontal direction, end at the perimeters of a region, cross over a portion of the region and are separated from each other by a unit value in the vertical direction.

15. The computer-readable medium of claim 13 further comprising a transform component for performing a transform on a region, the transform being an inverse of a text transform wherein the writing component performs the text transform on the text written into the text box.

16. The computer-readable medium of claim 13 wherein the text box defining component is of for forming multiple text boxes for a single text line.

17. The computer-readable medium of claim 13 wherein the text box defining component is for forming text boxes for multiple text lines.

18. The computer-readable medium of claim 13 wherein the scanning component is for identifying a set of lines in each of a set of regions, the text box defining component is for forming text boxes in each of the regions, and the writing component is for writing text into at least one text box in each of the regions.

19. The computer-readable medium of claim 18 wherein the writing component is capable of for writing different portions of a single string of text to text boxes in different regions.

20. The computer-readable medium of claim 19 wherein the text box defining component is a server process that is called by sending the text box defining component a region identifier, a text string identifier, and a font identifier.

21. The computer-readable medium of claim 20 wherein the text box defining component invokes the scanning component and the writing component.

22. The computer-readable medium of claim 20 wherein the text box defining component is called by sending the text box defining component a list of regions.

23. The computer-readable medium of claim 20 wherein the text box defining component is called by additionally sending the text box defining component a text transform matrix.

24. The computer-readable medium of claim 20 wherein the text box defining component is called by additionally sending the text box defining component a format identifier.

* * * * *